United States Patent [19]

Kovach

[11] Patent Number: 5,228,713

[45] Date of Patent: Jul. 20, 1993

[54] BOAT TRANSPORTING AND LAUNCHING TRAILER

[76] Inventor: Jere C. Kovach, Star Route, Willow Springs, Kemmerer, Wyo. 83101

[21] Appl. No.: 756,916

[22] Filed: Sep. 9, 1991

[51] Int. Cl.$^5$ ............................................. B60P 3/10
[52] U.S. Cl. ................................... 280/414.1; 414/483
[58] Field of Search ................. 280/414.1, 414.3, 163; 414/482, 483, 484

[56] References Cited

U.S. PATENT DOCUMENTS

| | | | |
|---|---|---|---|
| 2,586,485 | 2/1952 | Schroeder | 280/414.1 X |
| 3,989,266 | 11/1976 | Foster | 280/414.1 |
| 4,099,279 | 7/1978 | Park | 414/482 X |
| 4,286,906 | 9/1981 | Robertson | 414/484 X |
| 4,395,185 | 7/1983 | Whaley | 414/483 |
| 4,943,076 | 7/1990 | Tripke | 280/414.1 X |
| 4,946,332 | 8/1990 | Daniels | 280/414.1 X |
| 5,004,260 | 4/1991 | Smyly, Sr. | 280/414.1 |
| 5,013,206 | 5/1991 | Ernst et al. | 280/414.1 X |

*Primary Examiner*—David M. Mitchell
*Assistant Examiner*—Peter C. English
*Attorney, Agent, or Firm*—A. Ray Osburn

[57] ABSTRACT

A boat trailer adapted to be towed behind a vehicle, comprising a lower, boat-carrying frame and an upper, boat-guiding frame pivotally associated with the lower frame and provided with flotation devices. During launch, or recovery, of a boat into or out of a body of water, the upper frame floats pivoted from the lower frame to maintain boat restraining side rails in operable position during launch and recovery of the boat. Quickly attached and detached foot platforms are provided which allow the operator to walk along the upper frame to manually tend to the boat as necessary. A telescopingly extendible tongue is provided, to prevent the necessity of backing the towing vehicle into the water at gradually sloped launching sites.

8 Claims, 4 Drawing Sheets

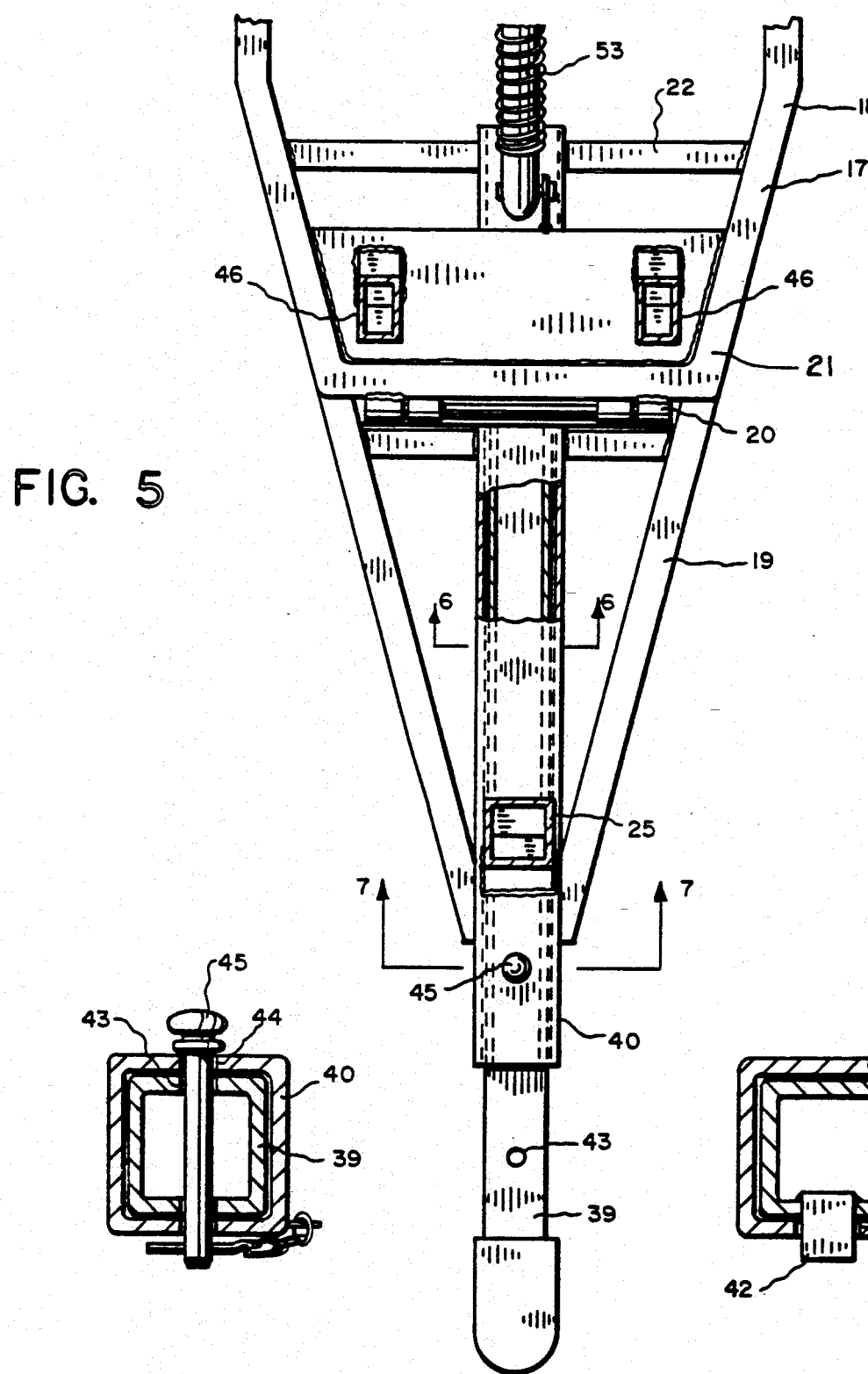

BOAT TRANSPORTING AND LAUNCHING TRAILER

BACKGROUND OF THE INVENTION

1. Field

The invention relates to boat trailers in general and more particularly to boat trailers which facilitate the launch and loading of boats into and from a body of water at an inclined launching ramp.

2. State of the Art

Prior art boat trailers are typically rigid, unitary, structures, which, to launch the boat, are backed into a body of water down an incline until the boat floats free of side restraints, which have sunk into the water along with the trailer. Precariously unrestrained, the boat may be buffeted by waves and wind, and perhaps damaged even before it is detached from the trailer. Boat recovery and loading is subject to the same difficulties and dangers. The prior art reveals few devices to improve boat trailers to facilitate water launching and loading. Many are directed to raising and lowering the boat carrying platform on level, dry, ground, to aid in loading and unloading heavy objects for transport overland. U.S. Pat. Nos. 2,754,129 and 2,621,942, e.g. U.S. Pat. No. 3,663,040 discloses a similar trailer for transporting boats from point to point within a boat fabrication, display, and sales yard. None of these devices are suited for use with boat launching and loading by way of inclined ramps, doing nothing to control the direction or attitude of the boat. The device disclosed in U.S. Pat. No. 3,494,630 permits the boat to be launched closer to the shoreline, by lowering the boat platform upon the associated wheel carriage. The device disclosed in U.S. Pat. No. 4,529,217 provides some directional control of a boat during loading. A pair of outrigger arms at the rear of the trailer diverge when freed of the weight of the boat in deep water, and return to vertical to center the boat when withdrawn from the water. However, this device does nothing to aid control of the boat during launch. U.S. Pat. No. 4,395,185 discloses two embodiments for maintaining a level attitude of the boat-carrying portion of the trailer when backed down a launching incline. Each embodiment carries a pair of flotation units at the rear of the boat-carrying portion and both involve complex linkages and multiple pivots acting between the boat-carrying portion and the remainder of the trailer.

The need therefore remains for an improved boat trailer for launching and loading boats from bodies of water at inclined ramps in the presence of buffeting wind and wave.

BRIEF SUMMARY OF THE INVENTION

With the foregoing in mind, the present invention eliminates or substantially alleviates the shortcomings and disadvantages of prior art trailers for transporting, launching and loading boats into and out of the water, by providing such a trailer with a tongue-equipped, elongate, rigid, lower frame having a cradle upon which the boat is carried. An elongate, rigid, upper frame is pivotally associated with the lower frame, and has upstanding, hull-engaging, side rails and attached flotation units which maintain the frame and the rails at boat-retaining elevation for launch and recovery from the water. Preferably, a number of quickly attached and detached foot platforms are provided, selectively positionable upon the tongue and the upper frame side members.

The frames each comprise a pair of elongate, spaced apart, side members joined by cross braces generally bowed down to clear the boat hull. The upper frame side members rest upon the lower frame side members. A cross hinge joins the frames at the bow end of the upper frame. A pair of stabilizing, two member, pivoting linkages connect the frames rearwardly of the hinge.

When the trailer is backed rearwardly down a typical inclined boat-launching ramp into a body of water, the flotation devices rotate the upper frame about the hinge, raising the frame stern end from the lower frame, so that it floats generally level in the water, with its side rails standing vertically, restraining the now floating boat. Preferably, a hull contacting roller unit is provided on the rearmost cross bore of the upper frame, to prevent hull scraping from deeper draft boats not floating completely clear, as well as from wave-induced bobbing of boat or upper frame.

During boat loading, the trailer is similarly placed, the side rails guiding the boat into position in the water above the boat cradle carried on the lower frame. The boat and the upper frame then settle upon the lower frame into land transport position when the trailer is withdrawn up the ramp from the water.

An upstanding stanchion is, preferably, provided on the forward end of the upper frame, with a clamp with a pair of spring biased jaws to grip the towing ring on the prow of the boat. A prow-engaging shock absorbing device may also be employed to initially slow the boat during loading.

Preferably, the tongue comprises an elongate member slideably associated with the lower frame, which is selectively extendable, so that the towing vehicle need not back into the water at gradually sloping ramp sites.

It is therefore the principal object of the invention to provide an improved boat trailer, facilitating launching and loading at inclined launch ramps, by maintaining positive control over the boat during both operations.

BRIEF DESCRIPTION OF THE DRAWINGS

In the drawings, which represent the best modes presently contemplated for carrying out the invention.

DETAILED DESCRIPTION OF ILLUSTRATED EMBODIMENTS

Figure 1:
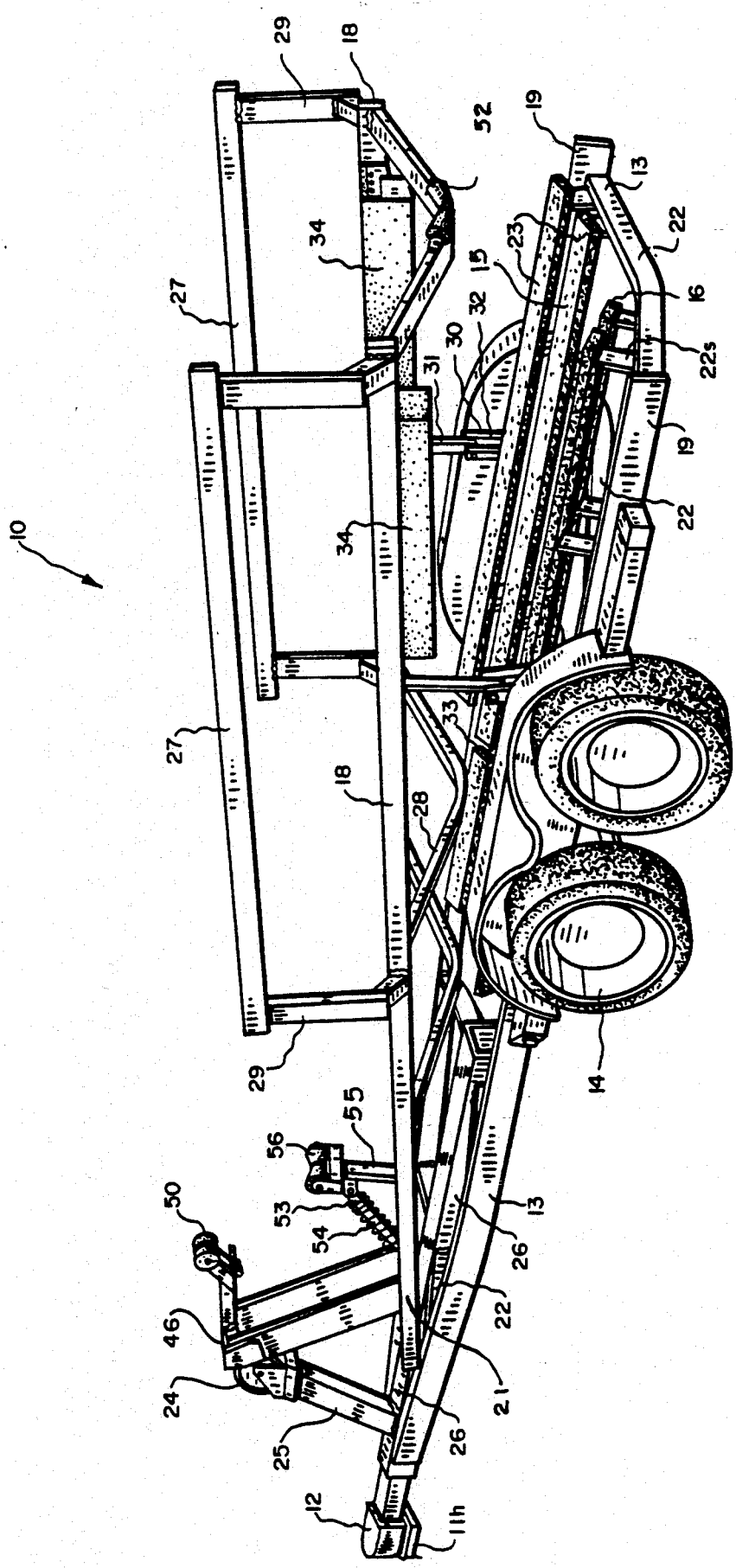
FIG. 1 is a perspective view of a boat transportation and launching trailer in accordance with the invention, the upper frame thereof being, for clarity of illustration, rotated upwardly about the forward hinge from the lower frame, drawn to a reduced scale, FIG. 2 a side elevation view of the trailer of FIG. 1, with a boat secured thereupon, approaching the water line down an inclined boat-launching ramp, drawn to a smaller scale than FIG. 1, FIG. 3 a side elevation view of the boat trailer of FIG. 2, now backed into the water down the inclined ramp into the boat recovery or loading position, with the upper frame floated off the submerged lower frame, drawn to the scale of FIG. 2, FIG. 4 a perspective view of a side rail selectively attachable foot platform, shown in conjunction with a fragment of said rail, drawn to a reduced scale, FIG. 5 a top plan view of a fragment of the forward end of the boat trailer of FIG. 1, showing the cross hinge connecting upper and lower frames and the extensible tongue member and housing therefor secured to the lower frame, drawn to a larger scale than FIG. 1, FIG. 6 a cross sectional view of the tongue and housing of FIG. 5, showing the tongue member connected guide pin, taken along line 6—6 of FIG. 5, drawn to a larger scale, FIG. 7 a cross sectional view of the tongue and housing of FIG. 5, showing the indexing pin thereof, drawn to the scale of FIG. 6, and FIG. 8 a perspective view of a fragment of the boat hitching assembly of FIG. 1, drawn to an enlarged scale.

Referring now to the figures in general and to FIG. 1 in particular, there is depicted a perspective view of an embodiment of the boat transporting and launching trailer 10 of the present invention.

Figure 4:
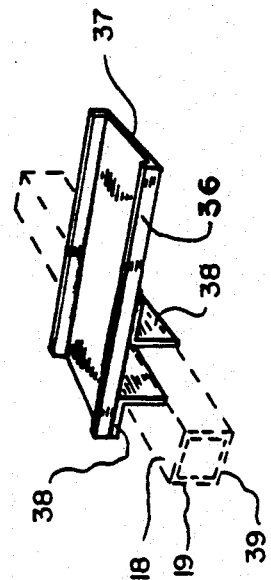

Trailer 10, coupled to hitch 11h of a towing vehicle 11 by a tongue assembly 12, comprises a lower rigid frame assembly 13, mounted upon a wheeled undercarriage 14 and supporting a boat platform 15 comprised of hull contacting elongate slats 16. An upper rigid frame assembly 17 has a pair of elongate side members 18, which during the road transport mode of operation of trailer 10 rest (FIG. 2) upon a pair of elongate side members 19 of lower frame 13, to which the foremost end 21 of upper frame 17 is secured by cross hinge assembly 20. (FIGS. 2-4) In FIG. 1, upper frame 17 is shown pivotally raised above lower frame 13, for clarity of illustration.

Lower frame 13 comprises the two elongate side members 19, formed to generally come together in an apex at tongue assembly 12. Welded cross braces 22 assure rigidity of lower frame 13, and carry upstanding, welded, supports 22s for the slats 16 of boat cradle platform 15. To position the boat upon trailer 10, side rails 27 are provided upon welded supports 29 upstanding from elongate side members 18 of upper frame 17. Welded cross braces 22 assure the rigidity of upper frame 17.

A boat loading and launching winch 24 may be provided forwardly of hinge 20, with an upstanding support post 25 secured to lower frame 13, as to a tongue-housing beam 26. Winch 24 could be relied upon to secure the boat upon trailer 10. Preferably, however a hitching assembly 46 is provided upstanding from the stern end of upper frame 17. Spring loaded jaws 47 clamp and retain towing ring 48 on boat prow 49, which is secured undamaged by operation of a pair of rubberoid buffer wheels 50. Winch line 51 may, as a safety precaution, also be hooked to ring 48. (FIGS. 1-3, 8)

Instead of relying entirely upon buffer wheels 50, a shock absorbing structure 53 may also be provided. (FIG. 1) Compression spring 54 is pivotally attached at its forward end to upper frame 17, and at its other end to a pivoting arm 55 upstanding from frame 17. Arm 55 carries another pair of prow-contacting rubberoid wheels 56. With shock absorber 53, the boat may be powered rapidly into position without danger of hull or prow damage.

A pair of linkages 30, each with an upper and a lower pivoting member 31 and 32, act with cross hinge 20 to stabilize upper frame 17 when it is in raised position during launch and loading modes. The cross braces 22 and 28 of lower and upper frames respectively all bow downwardly between respective side members 19 and 18 to provide bottom clearance for the boat hull, supported upon the cradle members 23. To allow upper frame 17 to be raised and lowered from lower frame 13, the longer pair of cradle members 16 is constructed with clearance gap 33 for one of the upper frame cross braces 28.

A pair of flotation devices 34, secured to the stern ends of side frame members 18, maintains upper frame 17 in a level position during boat launching and loading, as explained in detail below. Floats 34 may be comprised of a mass of buoyant material, or of wall members sealed together to define a void space. The floats 34 are preferably sized to impart a slight positive buoyancy to the stern end of upper frame 17.

Figure 2:
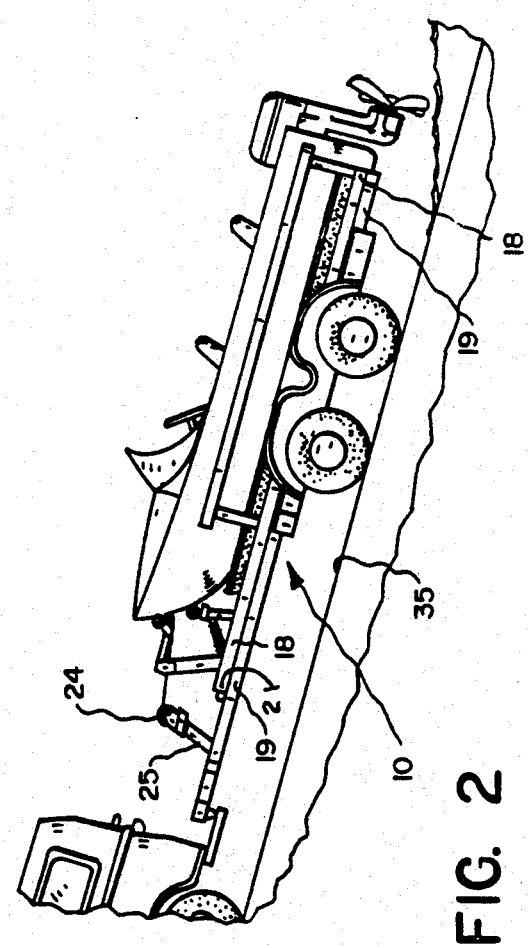

Referring now to FIG. 2, there is depicted a side view of a boat-laden trailer 10 in pre-launch position upon a launch ramp 35, in preparation for vehicle 11 to back it into the water, in the manner well known in the art.

Figure 3:
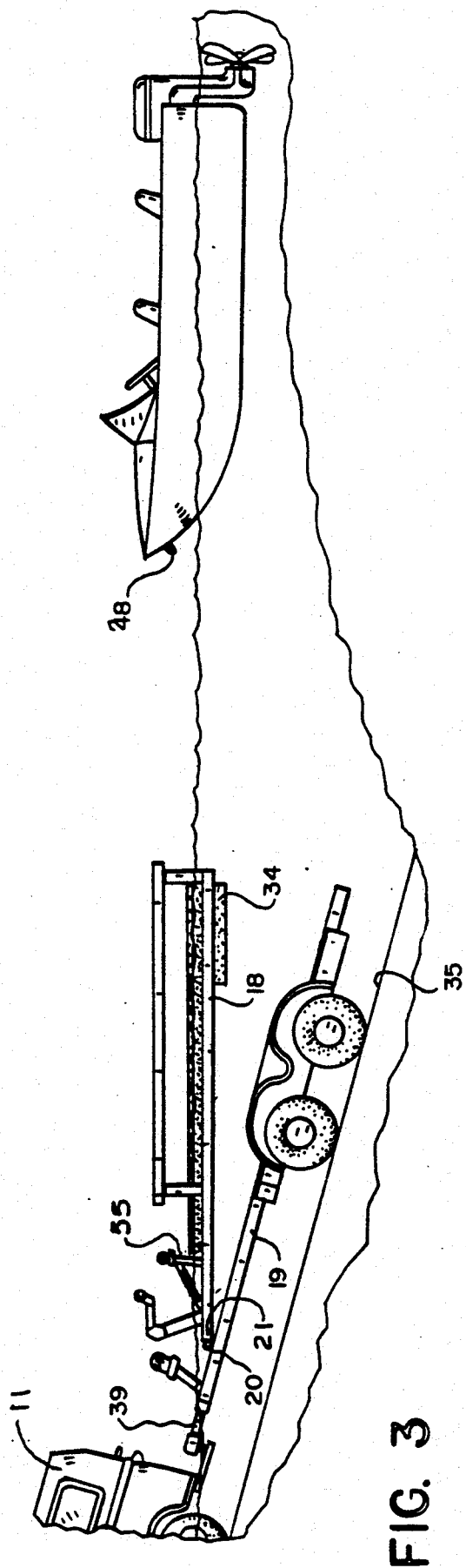
Figure 8:
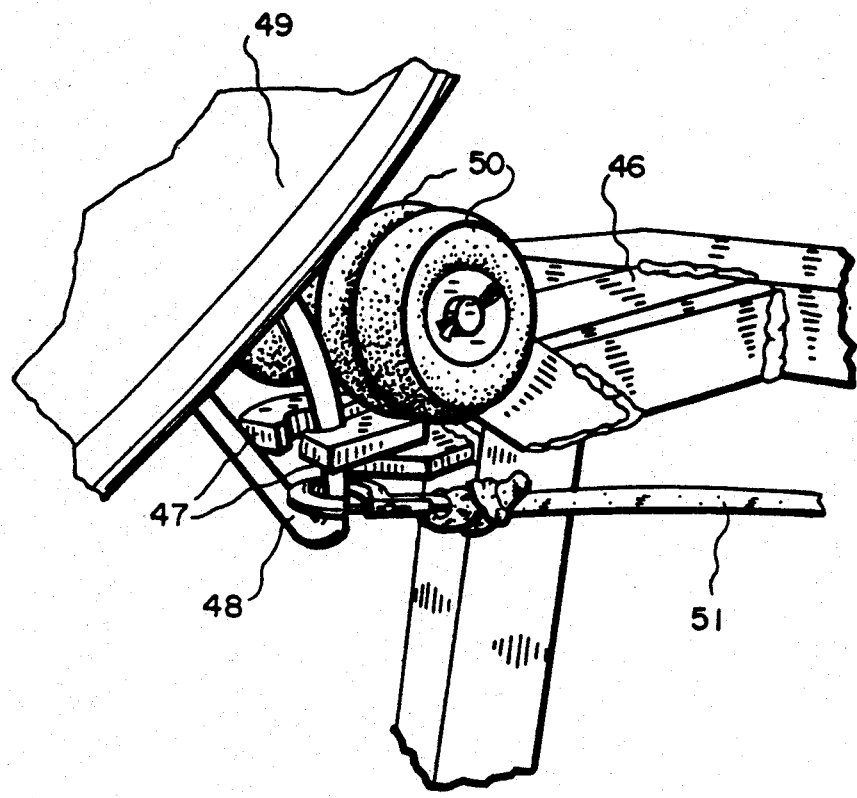

In FIG. 3 there is shown a boat trailer 10 in the post-launch, pre-recovery, position, the boat floating upon the water preparatory for loading. Trailer 10 has been backed into the water down ramp 35. As the depth of the water increases, the resultant buoyancy upon the boat causes it to float, and floats 34 cause upper frame 17 with boat restraining side rails 27 to also float, pivoting about hinge 20, stabilized by the pair of linkages 30. In floated position, the stern ends of side members 18, and the tops of the flotation units 34, are generally at the surface of the water.

The boat is released from winch line 51 and jaws 47, and launched from between rails 27, either manually or under its own power. Some boats may have sufficient draft as to not float entirely free of upper frame 17. In this event roller 52, mounted upon the rearmost of the cross braces 28, prevents any damage consequent to hull scraping. (FIG. 1)

When being loaded, the boat may, if desired, be pulled manually, or by winch 24, between, and guided by, rails 27. Preferably, the boat is driven, under its own power, onto upper frame 17, guided as necessary by rails 27. Prow 49 first impacts shock absorber wheels 56, and then nudges buffer wheels 50 as towing ring 48 is engaged by springloaded jaws 47. Roller 52 prevents any scraping of the bottom of the hull against frame 17. With the boat in loaded position, trailer 10 may be drawn from the water up the ramp 35, the boat and upper frame 17 settling together into road transport position when emerging from the water.

The boat floats safely above trailer cradle 15 during both launch and recovery. During recovery, guide rails 27 ensure that the boat is properly positioned above support cradle 15, especially important when strong winds and waves are present.

To facilitate any manual guidance of the boat which may be needed during launch or recovery, step units 36 are employed, principally upon upper frame side members 18, and, when needed, upon tongue member 39 and portions of lower frame side members 19. Foot platform members 37, channel shaped for rigidity, for example, carry welded-on angles 38, spaced apart as necessary to embrace tongue or frame side members. Non-slip treads, not shown, may be employed upon the cantilevered foot platforms 37.

With state-of-the-art boat trailers, the towing vehicle must often itself be backed into the water to obtain sufficient water depth to float the boat for launch. Trailer 10, however, incorporates an extensible elongate tongue member 39 telescoped inside a box beam housing 40 running from the front end of frame 13 rearwardly under and past hinge 20. Longitudinal slot 41 in the bottom member of housing 40 accepts a guide pin 42 welded downstanding from the rearmost end of tongue 39. Spaced apart positioning holes 43, bored vertically through tongue 39, allow it to be secured to project a selective distance, using an indexing pin 45. An indexing hole 44 is provided through housing 40. (FIG. 5) The vehicle connection end of tongue 39 is provided with state-of-the-art connection means, such as a socket to accept a vehicle mounted hitching ball along with conventional safety chains and the like, not shown. Trailer 10 also incorporates rear signal lights, along with wiring and control cables communicating with the towing vehicle, neither being shown.

The invention may be embodied in other specific forms without departing from the spirit or essential characteristics thereof. The present embodiments are therefore to be considered as illustrative and not restrictive, the scope of the invention being indicated by the appended claims rather than by the foregoing description, and all changes that come within the meaning and range of equivalency of the claims are therefore intended to be embraced therein.

What is claimed and desired to be secured by United States Letters Patent is:

1. A trailer for transporting a boat upon land, and for launching and recovering it onto and from a body of water, said boat trailer comprising:
   an elongate, rigid, generally horizontal, lower frame having a stern end and a bow end, a pair of opposing side members, means for supporting a boat horizontally thereupon, and means at the bow end for connection to a towing vehicle;
   a wheeled undercarriage secured to the lower frame;
   an elongate, rigid, upper frame having a stern end and a bow end, and a pair of opposing side members;
   means supporting the upper frame in generally horizontal position above the lower frame during transport of the boat upon land;
   pivot means at a forward most portion of the bow end of the upper frame, said pivot means pivotally securing the upper frame to the lower frame at a fixed location thereon;
   buoyant means secured to the upper frame rearwardly of the pivot means, to float said frame by rotating it about the pivot means during boat launch and recovery into and from the body of water; and
   a boat hitching stanchion upstanding from the bow end of the upper frame, carrying at the uppermost end thereof means for securingly engaging the prow of a boat to be transported by the trailer.

2. The boat trailer of claim 1, wherein:
   the pivot means comprises a hinge with a horizontal, laterally directed, axis of rotation.

3. The boat trailer of claim 2, further comprising:
   a stabilizing linkage having a pair of pivotally joined members pivotally connecting lower and upper frames rearwardly of the hinge, preventing lateral horizontal motion of the upper frame with respect to the lower frame while permitting vertical rotation thereof about the hinge.

4. The boat trailer of claim 1, wherein:
   the side members of the upper frame rest directly upon the side members of the lower frame during overland operation of the trailer.

5. The boat trailer of claim 1, wherein the towing vehicle connection means comprises:
   an elongate tongue member with vehicle hitching provisions at the foremost end thereof, said tongue member being securable to the lower frame with said foremost end at selective distances forward of the bow end of the lower frame.

6. The boat trailer of claim 5, further comprising:
   a multiplicity of foot platforms quickly attachable to, and detachable from, the side rails of the upper and lower frames; and
   a multiplicity of foot platforms quickly attachable to, and detachable from, the tongue member.

7. The boat trailer of claim 1, further comprising:
   a boat hitching stanchion upstanding from the bow end of the upper frame, carrying at the uppermost end thereof means for securingly engaging the prow of a boat to be transported by the trailer.

8. The boat trailer of claim 1, further comprising:
   bow-engaging shock absorbing means carried by the upper frame at the bow end thereof.

* * * * *